Figure 1:
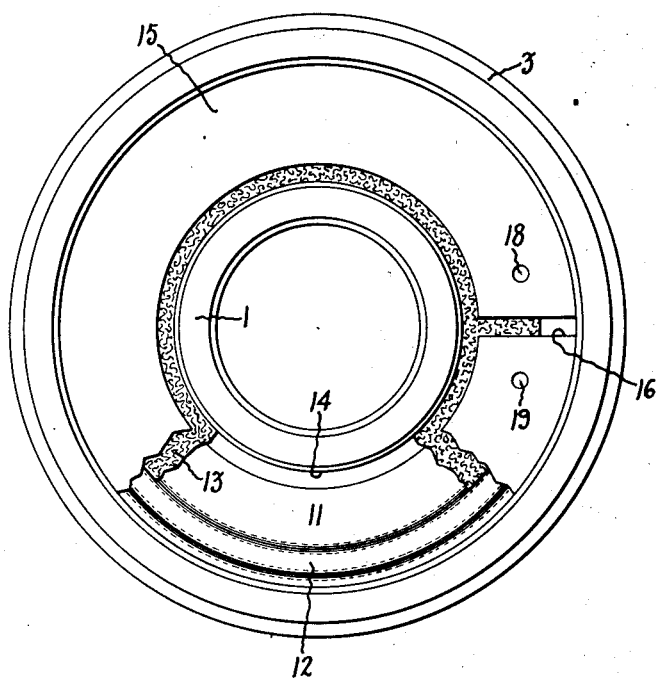

Oct. 28, 1952 R. E. PARRY 2,615,734
LUBRICANT SEAL FOR BEARINGS
Filed March 27, 1951

Inventor:
Ralph E. Parry,
by *[signature]*
His Attorney.

Patented Oct. 28, 1952

2,615,734

UNITED STATES PATENT OFFICE 2,615,734

LUBRICANT SEAL FOR BEARINGS

Ralph E. Parry, Cleveland, Ohio, assignor to General Electric Company, a corporation of New York Application March 27, 1951, Serial No. 217,845

1 Claim. (Cl. 286—5)

My invention relates to mechanical bearings and more particularly to means for sealing lubricants within the area of co-engagement of the component parts of such bearings.

In the present uses of radial bearings, such as ball bearings and roller bearings, it is highly desirable that lubricant placed therein be sealed permanently within the bearing in order that periodic lubrication of the bearings, with attendant disassembly of parts in the case of remotely located bearings, may be eliminated. It is further necessary that dust, dirt, and other foreign matter be kept out of the region of the bearing surfaces so that undue wear is not caused by such matter. While various bearing structures for sealing lubricant in and foreign matter out have been disclosed in the art, it is an object of my invention to provide a new and improved lubricant and dust seal for radial bearings.

In certain types of bearing seals used heretofore, pliable but lubricant and dust restraining materials, such as felt or leather, are in rubbing contact with a relatively rotating, cylindrical metallic surface. Such materials form suitable seals but, by nature, are subject to wear after a considerable amount of rubbing contact, which may lessen the tightness of the sealing contact. It is another object of my invention to provide a lubricant seal for radial bearings which is self-compensating for wear that occurs to pliable material used in the seal.

Many bearing seal systems used heretofore have depended upon closely machined tolerances on the component parts therefor in order that the seal be tightly effected. However, in the mass production of bearings, a great economy in cost results when the necessity for close tolerances on seal components is eliminated. It is, therefore, another object of my invention to provide a tight lubricant seal for radial bearings which does not require parts machined to relatively close tolerances.

Moreover, many bearing seal systems employ parts which are difficult, and therefore costly when considered on a mass production basis, to assemble and disassemble. Accordingly, it is still another object of my invention to provide a lubricant seal for radial bearings, the component parts of which may be assembled and disassembled with ease.

Briefly stated, my invention in one form thereof provides in the outer race member of a radial bearing a groove having sloping sides, i. e., a V-shaped groove, and a step surface adjacent thereto, both facing the inner race member of the bearing which is in coaxially spaced relation with the outer race member. A first annular disk, i. e., seal retainer, is positioned with the outer edge thereof engaging the step surface and a second annular disk, with a radial slot therein, is positioned in radial compression with the outer edge thereof engaging the surface of the groove. The first disk is provided with an annular rib projecting therefrom toward the second disk. An annular sealing disk of lubricant restraining material is located between the first and second disks, the inner edge surface thereof being in slidable sealing contact with a cylindrical surface of the inner race member, and the outer edge surface thereof engaging the inner, i. e., radially innermost, side of the rib on the first disk. The radial compression of the second disk tends to force the outer edge of that disk to the center of the annular groove, thereby compressing the sealing disk. The compressive force on the sealing disk, in turn, tends to force the sealing disk into tight engagement with the inner race member, since such force is resolved into an inward radial component by the compressive characteristics of the sealing material and by the rib on the first disk which restrains movement in a radially outward direction.

Figure 2:
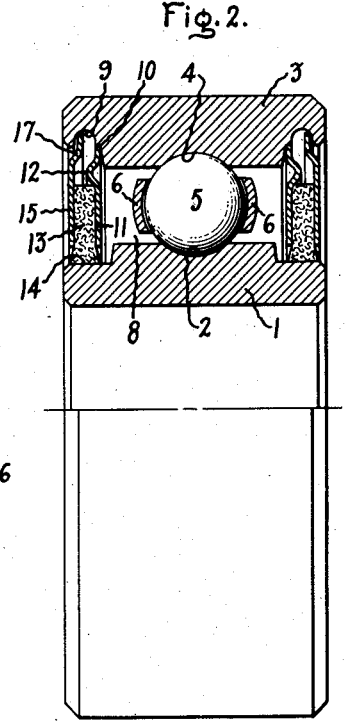

The scope of my invention is pointed out with particularity in the appended claim. However, for consideration of the novel features and construction of the invention, together with further objects and advantages thereof, reference should be had to the following description taken in conjunction with the accompanying drawing in which:

Fig. 1 is a plan view of a partially broken away bearing illustrating the lubricant seal of my invention; and Fig. 2 is a side elevation, partially in section, of the bearing and lubricant seal shown in Fig. 1.

Referring now to the drawing, there is shown in Figs. 1 and 2 a double seal ball bearing illustrating the lubricant seal of my invention. It is to be understood, however, that the invention may be employed on any type of radial bearing, either double or single seal, having need for sealing lubricant in a space between coaxially spaced relatively rotating members, such for example as a roller bearing. The illustrated ball bearing includes an inner member, such as a sleeve-like inner race 1, having an annular groove or raceway 2 in the outer surface thereof. An outer member, such as a sleeve-like outer race 3, having an annular groove or raceway 4 in the inner surface thereof is coaxially spaced from race 1 by a plurality of balls 5 (one being visible in the drawing) which are held in circumferentially spaced relation by a conventional ball retainer 6. Balls 5 roll in raceways 2 and 4 permitting relative rotational movement between races 1 and 3.

In order that lubricant may be applied permanently to, and foreign matter kept from, the contacting surfaces of the balls 5 and raceways 2 and 4 to reduce wear thereto and frictional resistance therebetween, the annular space 8 between races 1 and 3 is partially filled with a suitable lubricant, such as grease, and closed at its end by lubricant sealing means.

To seal the lubricant into space 8, I provide an annular groove having sloping sides such as a V-shaped groove or a radiused groove 9, i. e., a groove essentially semi-circular in cross-section, around the inner surface of outer race 3. Actually, a V-shaped groove is preferred, but I have found that a groove such as radiused groove 9 serves satisfactorily, at the same time being more conveniently and economically machined into outer race 3. Adjacent the groove 9 on its axially innermost side, there is a shoulder or step 10. The groove 9 and step 10 both face the inner race 1.

An inner annular disk, or inner seal retainer 11, having approximately the same outer radius and thickness as step 10 is positioned with its outer edge abutting or engaging step 10 to form an end wall for space 8. Inner retainer 11 is provided with an annular rib 12 therearound, preferably having sloping sides, for a purpose to be explained hereinafter.

An annular sealing disk 13 of lubricant restraining material is placed on the outer side of retainer 11, its inner edge having sliding and sealing contact with a smooth cylindrical outer surface 14 of inner race 1. Disk 13 has an inside radius essentially equal to or slightly smaller than the radius of surface 14 and an outside radius approximately the same as the radius of the radially innermost surface of rib 12. The material from which disk 13 is made may be any of those well-known to the art for lubricant seals, for instance felt, leather, or rubber-like synthetics, such materials being generally pliable and soft in order that they readily adapt themselves to the surfaces they slidably contact and cause no wear to the surfaces.

To retain sealing disk 13 in position and effect a tight seal between disk 13 and surface 14, an outer annular disk, or other seal retainer 15, having an outer diameter approximately the same as the diameter of groove 9 at its deepest point, and having a radial slot 16 therein, is positioned in radial stress, i. e., radial compression, with its outer edge engaging the surface of groove 9. This is accomplished by radially compressing retainer 15, thus reducing the width of slot 16, and then inserting its outer edge into groove 9. When released from the compressing force, retainer 15 tends to expand to its normal diameter but in doing so abuts at its outer edge with the curved surface of groove 9 which prevents such complete expansion.

It will now be seen that the radial compressive reaction force on outer retainer 15 in manifesting itself at the sloping surface in groove 9 is resolved into two components, one radial and one axial. The axial component tends to cause outer retainer 15 to move axially inward within outer race 3, thereby compressing sealing disk 13 between retainers 11 and 15 and holding disk 13 stationary with respect to outer race 3. At the same time, the axial compression of sealing disk 13 between retainers 11 and 15 tends to make disk 13 expand radially. With annular rib 12 restraining it from expanding radially outward, disk 13 can only try to expand radially inward. The resulting radially inward force holds sealing disk 13 in proper centered relationship with surface 14 and also affords a compressive contact therebetween. Thus, the seal between the inner edge of sealing disk 13 and surface 14 is a positive one, and for practical purposes prevents either the loss of lubricant from space 8 or the entry of foreign matter into space 8. As wear occurs to the inner edge of disk 13, the compressive force on disk 13 exerts a force component radially inward, compensating for such wear and maintaining a tight seal. This action is augmented by a further expanding of retainer 15 from its compressed condition. Further, a positive seal will also be maintained between the outer edge of retainer 11 and annular step 10 in outer race 3 by the aforementioned axial force exerted by retainer 15, especially in view of the fact that inner retainer 11 and outer race 3 remain stationary with respect to one another.

The cross-sectional shape of annular rib 12 is not critical to the function of the present invention as described hereinbefore. However, it may be shaped so as to advantageously augment the functioning of the self-adjusting seal. In an ideal form, rib 12 is V-shaped in cross-section, so that as sealing disk 13 is urged axially inwardly by retainer 15, it is also urged radially inward against surface 14. Again, in the practical and satisfactory form of the invention illustrated by the drawing, I have made rib 12 essentially V-shaped in cross-section but round at the vertex of the V, since such a rib is more conveniently formed without likelihood of cracking or breaking inner retainer 11.

It is readily apparent that the component parts of a lubricant seal constructed in accordance with the foregoing description need not be machined to close tolerances. Compensation for any slight error in the radius of either retainer 15 or groove 9 will be automatically provided by a lesser or greater restoration of the width of slot 16 when retainer 15 is placed in groove 9. Further, the inner radii of retainers 11 and 15 need not be machined for a close fit with surface 14 since the compressive contact of sealing disk 13 with surface 14 provides the necessary seal. One condition, however, should be fulfilled although it requires no parts cut or machined to relatively close tolerances, namely, the axial thickness of sealing disk 13 must be such that the outer edge of retainer 15 does not travel, under the reactive forces caused by radial compression in outer retainer 15, to the point of maximum depth in groove 9, thereby eliminating the radially inward reacting force on retainer 15 which compresses sealing disk 13 between retainers 11 and 15. Retainer 15 may be made perfectly flat in a successful seal, although I prefer to form a reverse bend 17 therein, as shown, in order that a thicker sealing disk 13 may be employed for given axial width of the outer race 3 and groove 9 therein. Further, reverse bend 17 also provides greater stiffness for retainer 15 to resist bending and warping.

The lubricant seal may be easily assembled on the bearing by the following steps: Lubricant is, of course, placed in the space 8 and retainer 11 slipped over inner race 1 into the position shown. Sealing disk 13 is next slipped over inner race 1 and against retainer 11 as shown. Then one corner, i. e., the outer edge adjacent slot 16, of retainer 15, is slipped into groove 9 and the outer edge of retainer 15 gradually worked into groove 9 by a circumferential motion imparted to the retainer. If slot 16 is of sufficient width and the material of retainer sufficiently resilient, retainer 15 may be squeezed together, i. e., radially compressed by squeezing so that slot 16 is temporarily closed, and its outer edge started into groove 9. When released, the spring restoration of retainer 15 pushes its outer edge up into groove 9 and exerts the previously described forces. To aid in assembly and disassembly, two small holes 18 and 19 may be provided in retainer 15 on opposite sides of slot 16. A pair of tweezers, or other suitable tool, may then be inserted into holes 18 and 19 to compress retainer 15, by closing slot 16, either for assembly or disassembly.

It will be obvious that the bearing seal construction shown and described may be turned "inside out" with equal success. That is, the sealing disk may be mounted to have rubbing and sealing contact with a smooth inner surface of outer race 3, while held between retainers supported in a groove and step provided in the outer surface of inner race 1. In this case, the slotted retainer 15 is placed in the groove with radial tension instead of radial compression but the principles of the seal structure are the same as those described hereinbefore.

While the present invention has been described by reference to a particular embodiment thereof, it will be understood that numerous modifications may be made by those skilled in the art without actually departing from the invention. I, therefore, aim in the appended claim to cover all such equivalent variations as come within the true spirit and scope of the foregoing disclosure.

What I claim as new and desire to secure by Letters Patent of the United States is:

A lubricant seal for a radial bearing having an inner member and an outer member in co-axially spaced relation with each other to provide relative rotation with respect to each other, and lubricant in the space between said members; said seal comprising: a first of said members provided with a U-shaped groove therein having sloped side surfaces and a shoulder adjacent one side of said groove, both facing the inner of said members; a first annular disk with an edge thereof engaging said shoulder; a second annular disk having a radial slot therein and having the outside diameter thereof greater than the maximum diameter of said groove when said disk is in its unstressed condition, the outer edge of said second disk slidingly engaging and being in radial resilient stress with the sloping side surface of said groove opposite said sloping side surface adjacent said shoulder; an annular rib projecting from said first disk toward said second disk; said first and second disks defining the axial bounds of a clearance space therebetween of such width that said rib cannot engage said first disk before said first disk has reached the limit of its radial expansion within said groove; and an annular sealing disk of lubricant restraining material between said first and second disk having the inner edge surface thereof in sealing contact with the inner of said members and the outer edge surface thereof in contact with said rib, the axial thickness of said sealing disk with respect to said clearance space being such that the groove engaging edge of said second disk cannot travel to the point of maximum diameter of said groove; the radial stress of said second disk forcing said outer edge of said second disk toward the center of said groove, compressing said sealing disk between said first and second disks and into contact with the inner of said members.

RALPH E. PARRY.

REFERENCES CITED

The following references are of record in the file of this patent:

UNITED STATES PATENTS

| Number | Name | Date |
|---|---|---|
| Re. 21,584 | Brodin | Oct. 1, 1940 |
| 1,903,217 | Hodge | Mar. 28, 1933 |
| 2,071,198 | Chambers | Feb. 16, 1937 |
| 2,100,113 | Travis | Nov. 23, 1937 |